June 30, 1964        R. H. GRABIEL        3,139,298
INSTRUMENT FOR INSERTING CORNEAL LENSES
Original Filed Jan. 27, 1961
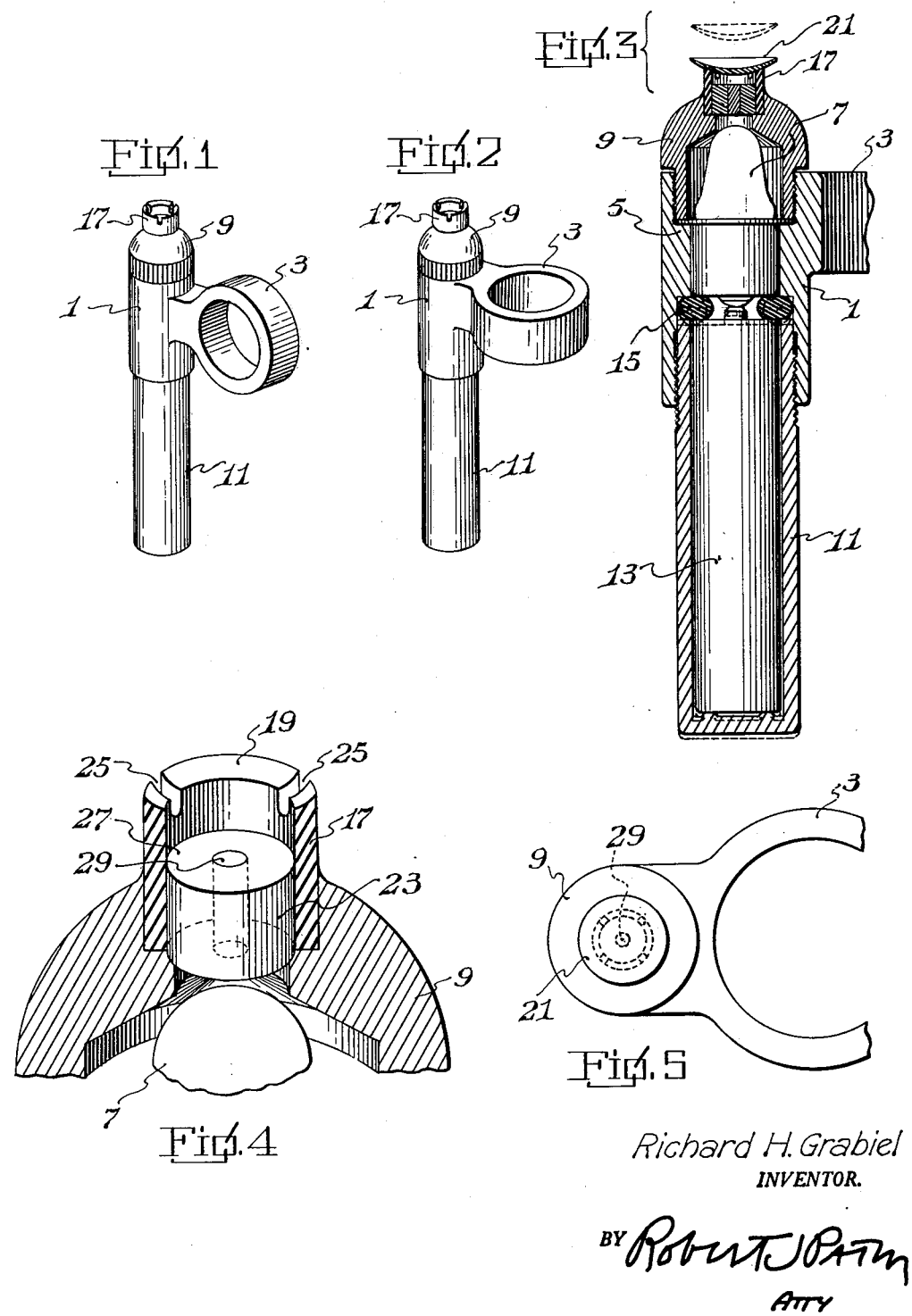
Richard H. Grabiel
INVENTOR.
BY Robert J Patin
ATTY

United States Patent Office 3,139,298
Patented June 30, 1964

3,139,298
INSTRUMENT FOR INSERTING CORNEAL
LENSES
Richard H. Grabiel, 230 W. 13th St., Tulsa, Okla.
Continuation of application Ser. No. 86,253, Jan. 27,
1961. This application Apr. 11, 1962, Ser. No. 188,607
4 Claims. (Cl. 294—1)

The present invention relates to instruments for inserting contact lenses between the eyelid and the eyeball. More particularly, but not by way of limitation, the present invention relates to a method and instrument for placing corneal lenses in proper position over the cornea of the eye.

The practice of using corneal lenses has become quite common, either as a substitute for spectacles or to overcome deficiencies of vision which cannot be corrected by the use of spectacles alone. In applying a corneal lens, it is necessary that the lens be placed on the eye with its optical axis coincident with the optical axis of the eye. The common method of inserting a corneal lens is to balance it, convex side down, on the tip end of the forefinger. The head is then bent forward to a nearly horizontal position and the corneal lens is then raised until it makes contact with the eyeball.

When the lens is inserted in this manner, however, the position of the lens on the finger is unstable, for the convex side of the lens is balanced on the convex side of the finger. A slight tremor in the hand can cause the lens to fall off with resultant loss of time or possible breakage of the lens. It is also extremely difficult to maintain the lens in an exactly horizontal and level position on the end of the finger and, unless such leveling can be accomplished, it is impossible to fill the concavity of the lens with an antiseptic ophthalmic fluid—a procedure which is highly desirable since the fluid sterilizes the surface of the lens which contacts the eyeball and provides a lubricating film between the cornea and the lens.

Another disadvantage of the finger technique of inserting the corneal lens is the unsanitary contact of the finger with the convex side of the lens. By virtue of such contact, the convex surface of the lens becomes unsterile.

Moreover, ophthalmological authorities are in agreement that the muscles which control the focusing of the crystalline lens of the eye by thickening it or making it thinner cannot thicken the crystalline lens enough to permit object perception within one and one-half inches of the eye. This distance may be termed the focal point of vision, and, within it, an object such as a corneal lens is not visible. Therefore, the last inch or so of movement of the corneal lens into position on the cornea has heretofore been merely a matter of guess. In addition, since almost all of the illumination through the lens from below is cut off by the presence of the finger, the distance at which the lens is clearly perceptible may be even greater. The fact that the crystalline lens and the muscles controlling it may not function at full efficiency in persons whose vision is so defective as to warrant corneal lenses frequently is the cause of enhanced difficulty in properly aligning the lenses for insertion in the eyes.

Finally, it will be apparent that the finger method of inserting corneal lenses cannot be accomplished in a room which is not lighted. Visibility must at least be sufficient to allow the user of the lenses to view the finger in order to maintain the balance of the lens on the finger and also to maintain approximate alignment of the lens as it is inserted in the eye.

In its broadest aspect, the present invention provides a method for applying a contact lens in proper position with respect to the optical axis of the eye, during which application the lens may be retained in a perfectly level, horizontal position so that its concavity may be filled with an antiseptic ophthalmic fluid. The method is accomplished by the use of a novel instrument which comprises a tubular or hollow cylindrical member which supports the lens, concave side up, upon one of its ends. Means is provided in the hollow cylindrical member for channeling light rays from a source located below the member in a straight line along the axis of the cylindrical member and through the center of the lens. The small pencil of light which extends in a straight line from the light source through the tubular member and the center of the lens may then be sighted by the eye as the lens is moved toward the eye. The line of sight of the eye, corresponding to its optical axis, will then coincide with the line of light until the instant when the eyeball contacts the ophthalmic fluid contained in the concavity of the lens. At this instant, the capillary attraction of the fluid will retain the lens in proper position over the eyeball and the instrument may be moved away from the eye.

It is accordingly an object of the present invention to provide a method and an instrument for inserting corneal lenses, which will assure proper alignment of the lens with the optical axis of the eye.

Another object of the present invention is the provision of an instrument for inserting corneal lenses which aids in applying non-irritating antiseptic ophthalmic fluid to the lens, and which permits both sides of the lens to be bathed in such fluid at the instant of insertion of the lens.

Still another object of the present invention is the provision of an instrument for inserting corneal lenses which greatly reduces the chances of dropping the lens and which aids in keeping the lens clean prior to insertion.

An additional object of the present invention is to provide an instrument for inserting corneal lenses which functions to permit the lens to be properly inserted in the eye even in a room which is completely dark.

Finally, it is an object of the present invention to provide an instrument for inserting corneal lenses, which instrument is relatively inexpensive to manufacture and is safe and easy to use.

Other objects and advantages of the present invention will become apparent from a consideration of the following description taken in conjunction with the accompanying drawings which illustrate my invention.

In the drawings:

FIGURE 1 is a perspective view of an instrument constructed according to the present invention for inserting corneal lenses.

FIGURE 2 is a view similar to FIG. 1 but showing a modified embodiment of the present invention.

FIGURE 3 is a view of the embodiment of FIG. 2 shown enlarged and in cross section.

FIGURE 4 is a greatly enlarged fragmentary perspective view of the upper or lens supporting end of the instrument.

FIGURE 5 is a plan view of the instrument as illustrated in FIG. 3 but with none of the parts illustrated in cross section.

Referring to the drawings in greater detail, it will be seen that the device of the present invention is a relatively small instrument, which may, for example, be about three inches long. In general, it comprises a body 1 provided with a handle 3 in the form of a finger ring adapted to be slipped over a single finger to support the device on the finger. FIG. 1 shows the axis of the finger ring transverse to the axis of the instrument, for those who prefer to insert the lens with the finger horizontal; while FIG. 2 shows the finger ring so disposed that its axis is parallel to the axis of the device proper, for those who prefer to insert the lens with the finger upright. If desired, the finger rings may be eliminated, and the device manipulated simply by gripping the body with the fingers.

In either case, the body of the device is provided with a central bore therethrough having a reduced portion intermediate its length providing a seat 5 for the base of an electric light bulb 7. A cap 9 comprises a further portion of the body 1 and is in detachable, screw-fitted engagement with the remainder of body 1 so as to clamp light bulb 7 in place by its flange. In some instances, it may be desirable to construct the cap 9 so that it may be snap-fitted to the remainder of the body 1 rather than threaded thereon.

At the other end of body 1, the central bore is internally screw-fitted for engagement with external screw threads on the upper end of a battery case 11 adapted to contain a replaceable battery 13. The battery case 11 also forms a stable base member which is adapted to stably support the instrument on a flat surface for the purposes and in the manner hereinafter described. A resilient member, such as a ring 15 of rubber, or other elastic deformable material, is disposed between battery case 11 and battery 13 on the one hand, and seat 5 and light bulb 7 on the other hand, to continuously urge the light bulb and battery contacts out of engagement with each other. Thus, turning battery case 11 in one direction will screw it into body 1 and compress ring 15 and bring the battery and bulb contacts into engagement with each other to cause light bulb 7 to light. Turning the battery case 11 in the opposite direction will permit the ring 15 to urge the contacts apart. Body 1 and battery case 11 are preferably constructed of metal so as to complete the electrical circuit when the contacts touch. However, the body 1 and battery case 11 may each be made of plastic and electrical contact then established between the battery pole and the bulb base by a suitable conducting element, such as a helical compression spring.

The body of the instrument carries a support for corneal lenses in the form of an annular member comprising a cylindrical sleeve or member 17 having an exposed upper edge 19 of an elastic deformable material having a high coefficient of friction. In the illustrated embodiment, a suitable upper edge material is provided by making sleeve 17 of rubber. Upper edge 19 has exposed surfaces which lie on an upwardly concave figure of revolution. In the illustrated embodiment, the surfaces of upper edge 19 lie on the surface of an imaginary sphere, and, in any event, it is intended that these upper surfaces conform to the curvature of the concavo-convex or miniscule corneal lens 21. Hence, when the term "figure of revolution" is used herein, it is intended that the usual deviation from a perfectly symmetrical figure be included.

The cylindrical sleeve 17 contains a cylindrical bottom plug 23 which is pressed into the sleeve 17 and spaced below the upper edge 19. In order that the lens 21 not be held on its support by suction when it is desired to insert it into the eye, upper edge 19 of sleeve 17 is provided with a plurality of notches 25 of a width sufficiently great to permit the entry of air into the sleeve 17 below the lens when the lens is inserted in the eye.

Bottom plug 23 is light penetrable so that light from bulb 7 may shine up therethrough and through the lens 21 to give a visual indication to the user when lens 21 is correctly oriented relative to the cornea. To improve the "aim" of the device, particularly when the lens is brought within one and one-half inches of the eyeball, bottom plug 23 is made in the form of two concentric sections, the central section visually contrasting with the surrounding section to form a bull's eye type target. The larger and radially outer section is a field 27 which is translucent and has relatively low light transmittance and may, for example, be made of frosted plastic. Field 27 surrounds a central core or bull's eye 29 which is of relatively high light transmittance, specifically transparent, and may, for example, be made of clear plastic.

Sleeve 17 is opaque, field 27 is of relatively low light transmittance and central core 29 is of relatively high light transmittance. As the illuminated light bulb 7 is viewed through a lens 21 resting on sleeve 17, as in FIG. 3, there is seen a lighted circular area corresponding to the outline of field 27 with a central bright spot or bull's eye corresponding to the core 29. The light source comprising light bulb 7 is in alignment with core 29 which, in turn, is coaxial with sleeve 17. Therefore, when lens 21 rests on edge 19 in concentric relationship with sleeve 17, the optical axis of the lens will coincide with this beam of light. The significance of this relationship will be readily apparent when it is remembered that the eye itself is provided with only a relatively very small opening or pupil through which light may pass, and that this pupil lies on the optical axis of the eye adjacent the anterior end thereof. Thus, when the beam of light along the optical axis of lens 21 is seen at its brightest, the optical axis of lens 21 and of the eye will coincide. When the instrument is moved toward the eye until lens 21 touches the eyeball, and this relationship is constantly maintained during such movement, assurance is thereby gained that lens 21 is properly emplaced.

Although the provision of any visually contrasting target characteristics in the field 27 and core 29 provides considerable improvement in assuring alignment of lenses upon insertion, the preferred arrangement is to make the core 29 of relatively high light transmittance as compared with the surrounding annular field 27. This is due to the fact that a relatively dark bull's eye or central portion tends to disappear into a surrounding annular illuminated field when the focal point of the eye is reached. This difficulty is not experienced when the central bull's eye is the source of light of greater intensity than the surrounding annular field.

To use the device, it is necessary only to screw in the battery case until the bulb and battery terminals contact each other and the bulb is lit. The device is next slipped over a finger. A clean corneal lens 21 is then set, convex side down, on the support provided by upper edge 19 of sleeve 17. As sleeve 17 is of a diameter less than the diameter of the lens, the lens can be held edgewise between the fingers without touching either optical surface of the lens or in any other way dirtying the lens. The lens may be centered on its support simply by pushing horizontally on its edge with the fingers until the circle of edge 19 is seen to be concentric with the circular edge of the lens. The light shines up through the bottom plug 23, is diffused through field 27 and shines brightly through core 29, and it is fairly simple to emplace the lens as described above. It should also be noted that the instrument provides sufficient illumination to allow the lens to be properly positioned even in a totally darkened room. After the lens has been properly located upon the upper edge 19 of sleeve 17, the concavity of the lens may be filled with a sterile ophthalmic fluid.

The eye is then brought over the instrument and the luminous "bull's eye" formed by the core 29 is sighted. When the core 29 appears brightest, the optical axis of the eye is aligned with the optical axis of the lens. The instrument is then moved upwardly, maintaining this alignment, until the eyeball contacts the ophthalmic fluid in the concavity of the lens. The "suction" created by forces of capillary attraction will then suck the lens into place over the cornea and the instrument may be withdrawn. It will be noted that when the concavity of the lens has been completely filled with ophthalmic fluid, the fluid will be displaced by the eyeball and will flow around the periphery of the lens and back onto the convex side of the lens to achieve sterilization and lubrication thereof.

Instead of moving the instrument upwardly to bring the corneal lens into contact with the eyeball, the base or bottom of the battery case 11 may be rested upon a flat horizontal surface, such as a table provides, and the eye may be lowered until it is in contact with the lens or the ophthalmic fluid contained therein. This procedure for inserting the lens is particularly advantageous for aged people whose hands are not steady and who may experience some difficulty in bringing the instrument upward in a straight line towards the eye in which the lens is to be inserted.

From a consideration of the foregoing description, it will be obvious that all of the initially recited objects of the present invention are achieved and that additional advantages accrue from the utilization of the method and instrument of the invention.

The present invention is a continuation of my copending application, Serial Number 86,253, filed January 27, 1961, now abandoned, which is a continuation-in-part of my application, Serial Number 833,484, filed August 13, 1959, now abandoned.

Changes may be made in the combination and arrangement of parts or elements as heretofore set forth in the specification and shown in the drawings, it being understood that changes may be made in the precise embodiments disclosed without departing from the spirit and scope of the invention as defined in the following claims.

I claim:

1. An instrument for inserting corneal lenses comprising a hollow cylindrical supporting member adapted to stably support a round concavo-convex lens positioned concentrically on its marginal edge at one of its ends; a source of light at the end of said hollow cylindrical member opposite said one end; and light-transmitting means in said hollow cylindrical member for transmitting light of greater intensity along the axis of said cylindrical member than is transmitted through the annular space surrounding said axis, said light-transmitting means comprising a solid cylindrical body having an outside diameter substantially equal to the inside diameter of said hollow cylindrical supporting member, and further having a central portion of transparent material extending along its axis, and an annular portion of translucent material surrounding said central portion.

2. An instrument for inserting corneal lenses comprising a hollow cylindrical supporting member adapted to stably support a round concavo-convex lens positioned concentrically on its marginal edge at one of its ends; and light-transmitting means in said hollow cylindrical member for transmitting light of greater intensity along the axis of said cylindrical member than is transmitted through the annular space surrounding said axis, said light-transmitting means comprising a solid cylindrical body pressed into said cylindrical member, and having an axial, centrally disposed transparent portion, and further having an annular portion of translucent material surrounding said central portion whereby a light source at the end of said cylindrical member opposite said one end thereof is discerned as a bull's eye target when viewed through said cylindrical supporting member from said one end.

3. An instrument for inserting corneal lenses comprising a hollow cylindrical support of resilient material adapted to stably support a round concavo-convex lens positioned concentrically on its marginal edge at one of its ends, said marginal edge being recessed to provide at least one passageway between the exterior and the interior of the support when a lens is supported thereon; a solid cylindrical plug pressed into said support and having a transparent, central, axially extending portion and a translucent, annular portion around said central portion, said annular portion contrasting visually with said axial portion to provide a target when viewed through the lens supported on said hollow cylindrical lens support; and means for supporting a light source secured to said support below said solid cylindrical plug.

4. An instrument for inserting a concavo-convex corneal lens of a size to cover the cornea of the eye, said instrument comprising:
 a generally cylindrical supporting member having an upper end portion of resilient material for cushioning a corneal lens supported on said upper end portion;
 a target portion spaced from said upper end portion along the axis of said cylindrical supporting member by a distance sufficient for said target portion to be visually discerned by the eye at the instant a lens resting on said cylindrical supporting member touches the cornea of the eye, said target portion having bull's eye indicia in the center thereof coaxially aligned with said cylindrical supporting member, and said bull's eye indicia being smaller in diameter than the diameter of said cylindrical supporting member;
 a base member positioned on the opposite side of said target portion from said upper end portion of said cylindrical supporting member and adapted to stably support said instrument on a flat surface; and
 a body interconnecting said base member and said cylindrical supporting member and spacing said base member from said cylindrical supporting member, said body including a handle by which, in inserting said lens, said instrument may be lifted in a straight line coinciding with the axis of said cylindrical supporting member.

References Cited in the file of this patent

UNITED STATES PATENTS

| 2,691,918 | Robins et al. | Oct. 19, 1954 |
| 2,919,696 | Rinaldy | Jan. 5, 1960 |
| 3,031,918 | Moyers | May 1, 1962 |

FOREIGN PATENTS

| 938,272 | Germany | Jan. 26, 1956 |

OTHER REFERENCES

The Plastic Contact Lens Co. Newsletter, copyright September 1, 1956, 1 page.

The Plastic Contact Lens Co. Newsletter, vol. #33, May 15, 1957, 1 page.